March 15, 1949. K. R. STEARNS 2,464,357
UNIT POWER PLANT
Filed Nov. 9, 1946 4 Sheets-Sheet 1

WITNESSES:
U. W. Novak
E. H. Lutz

INVENTOR
KENNETH R. STEARNS
BY
A. B. Reavis
ATTORNEY

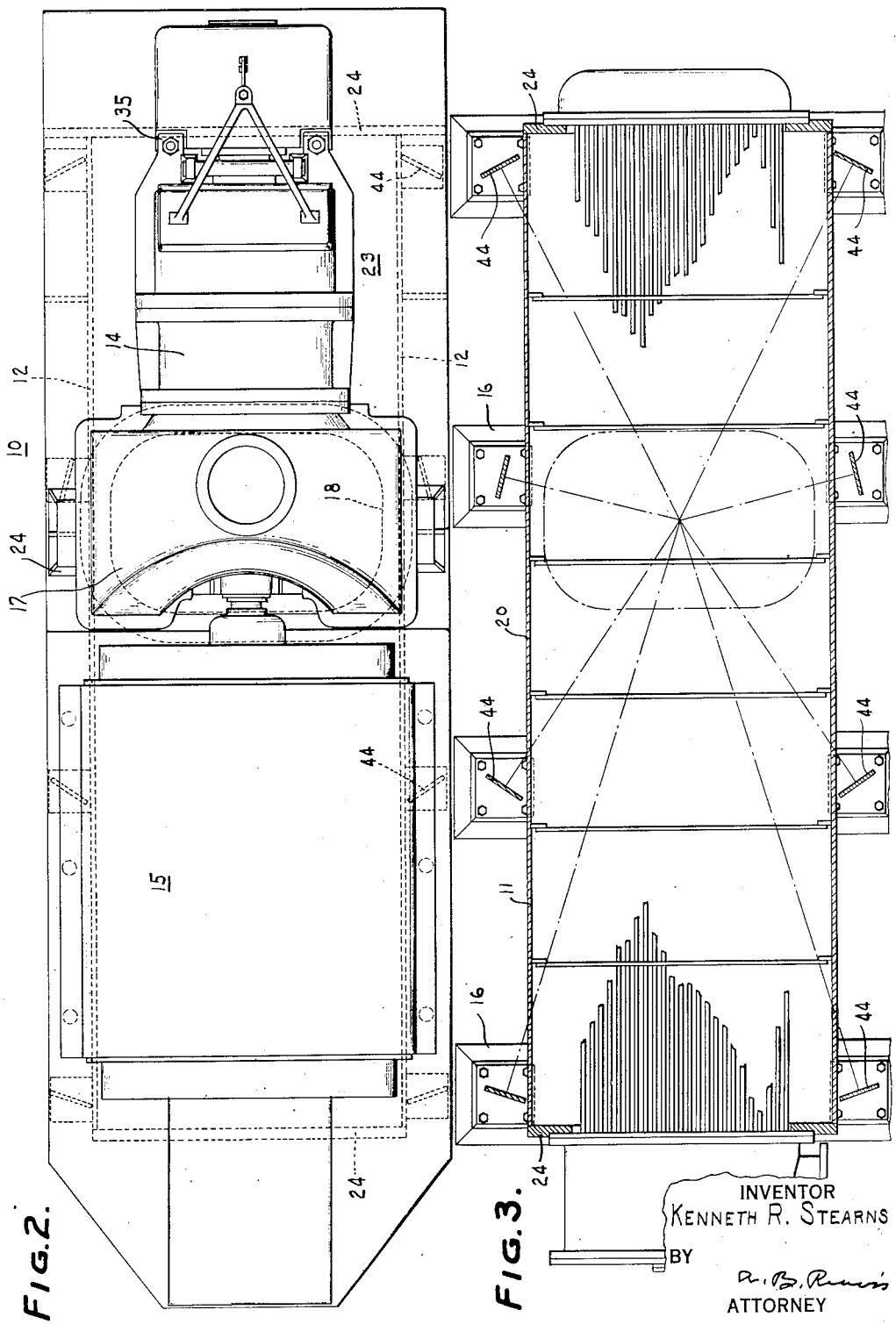

March 15, 1949. K. R. STEARNS 2,464,357
UNIT POWER PLANT
Filed Nov. 9, 1946 4 Sheets-Sheet 4

INVENTOR
KENNETH R. STEARNS
BY
ATTORNEY

Patented Mar. 15, 1949

2,464,357

UNITED STATES PATENT OFFICE 2,464,357

UNIT POWER PLANT

Kenneth R. Stearns, Springfield, Pa., assignor to Westinghouse Electric Corporation, East Pittsburgh, Pa., a corporation of Pennsylvania Application November 9, 1946, Serial No. 708,880

3 Claims. (Cl. 290—52)

The invention relates to a power plant having a turbine driving a generator and exhausting to a condenser and has for an object to provide such apparatus embodied as a unitary or "package" plant wherein the condenser supports the turbine and the generator and is supported by the foundation in such manner that the turbine and condenser are free to expand and contract with the turbine axis held vertically and horizontally and without loading the foundation.

A further object is to provide a condenser supported from the foundation by web plates arranged to flex to accommodate for expansion and contraction of the condenser structure to avoid any substantial loading of the foundation on account thereof.

A further object of the invention is to provide a horizontal condenser aggregate including a condenser and girder structures with means for supporting a turbine and a generator above the condenser by columns whose lower ends bear on and are connected to the girder structures and whose upper ends support and are connected to the generator and to the exhaust end of the turbine and with vertical means for supporting the girder structures from the foundation so that the aggregate may expand and contract without imposing any substantial load on account thereof on the foundation.

The foregoing and other objects are effected by the invention as will be apparent from the following description and claims taken in connection with the accompanying drawings, forming a part of this application, in which:

Fig. 2 is a top plan view of the apparatus shown in Fig. 1;

Fig. 3 is a section along the line III—III of Fig. 1;

Figure 1:
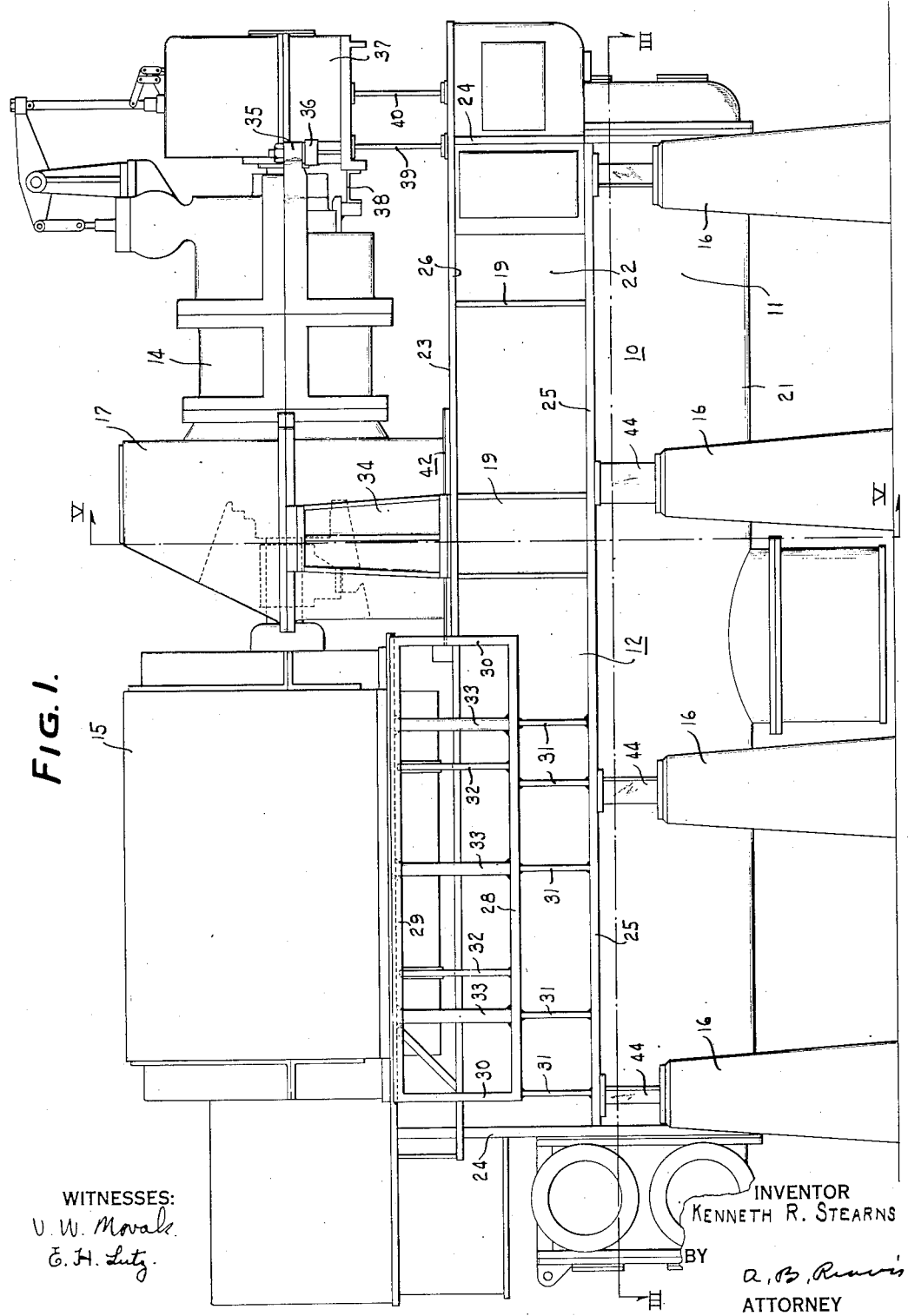
Fig. 1 is a side elevation of the unitary power plant.
Figure 4:
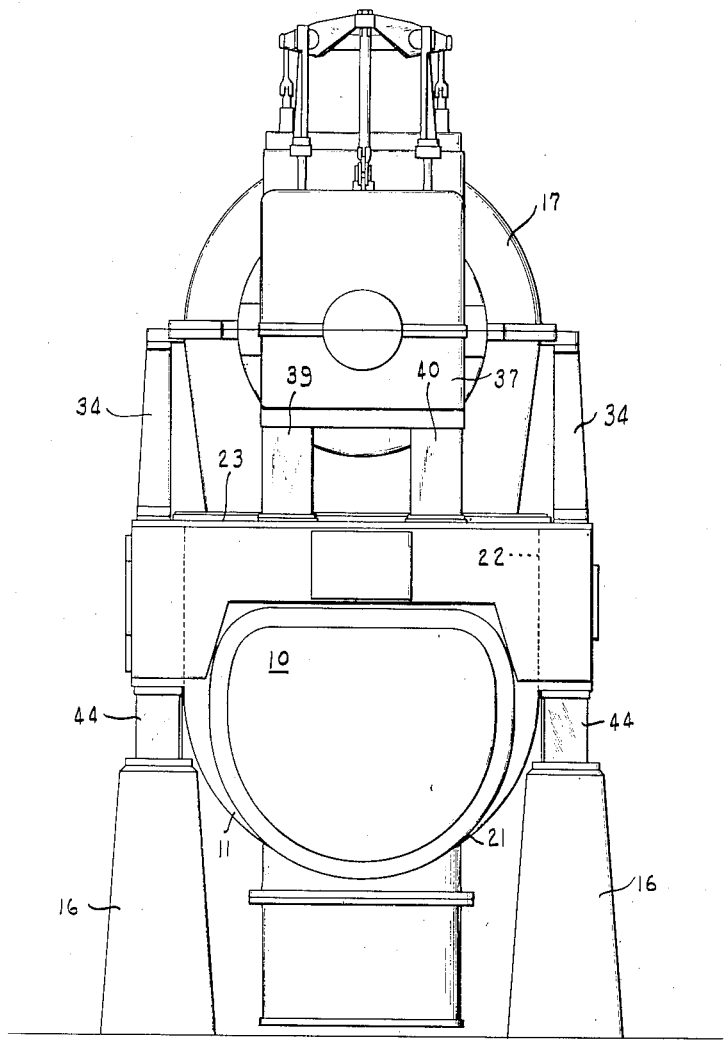
Fig. 4 is an end elevation of the plant as viewed from the turbine end.
Figure 5:
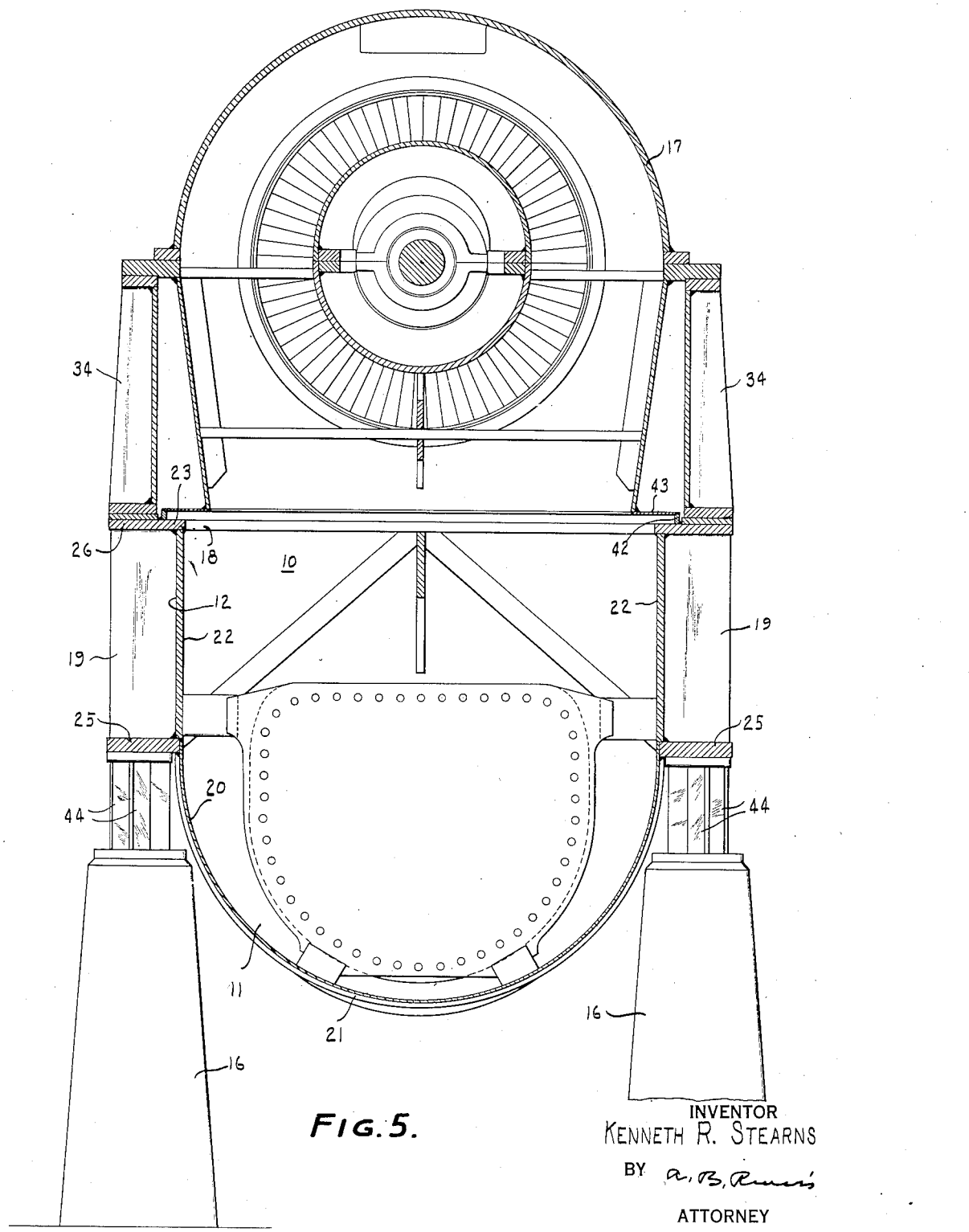
Fig. 5 is a section taken on the line V—V of Fig. 1.

In the drawing, there is shown a unitary power plant comprising a horizontal condenser aggregate, at 10, including a condenser 11 and girder structures 12 unitary with the latter at the sides thereof. The aggregate carries the axially-aligned turbine 14 and generator 15 thereabove and its side girder structures are supported by foundation piers 16. The turbine has an exhaust nozzle 17 from which exhaust steam flows through the inlet opening 18 into the condenser.

The condenser shell 20 includes a concave bottom wall 21, vertical side walls 22, a horizontal top wall 23, and end walls 24. The top wall 23 is provided with said inlet opening 18.

The girder structures 12 include lower flanges 25 and web portions, comprised by the adjacent side walls 22. For the length of the turbine, the girder structures are of braced channel form, the top plate overhanging and being joined to the side wall webs 19 to provide upper flanges 26; and, for the length of the generator, the girder structures are of angle form, defined by the webs 22 and the lower flanges 25 and are reinforced by structures forming the generator air cooling passages, such structures comprising lower, upper, and end plates 28, 29 and 30, respectively, strut plates 31 supporting the lower plates 28 on the lower flanges 25, the duct-dividing plates 32 stiffening the lower plates 28 to function as stiffened elements of the side condenser girders, and the end plates joining the upper and lower plates.

The generator is supported above the condenser on the top plates 29 and the load of the latter is transmitted through columns 33 whose upper ends are connected to the upper plates and whose lower ends are connected to the stiffened lower plates forming components of the condenser integral side girders. As the columns are free to flux laterally and as the rectangular structures formed by the plates 28, 29 and 30 are not stiffened diagonally, such structures are capable of deformation to the extent required to accommodate for relative expansion and contraction of the generator, turbine and condenser, the upper plates 29 remaining fixed relative to the generator and moving relative to the lower plates 28 to the extent required for such accommodation and the columns 33 carrying the weight of the generator directly on the condenser side girder plates 28.

The exhaust end of the turbine casing is carried by columns 34 whose lower ends bear on and are connected to the girder structures and whose upper ends carry and are connected to the turbine casing. The inlet end of the turbine casing has feet 35 which bear on abutments 36 carried by the bearing pedestal 37. The turbine casing is connected to the bearing pedestal by the vertically flexible tie plate 38 and the pedestal is supported from the condenser by plates 39 and 40 extending in planes normal to the turbine axis and are therefore arranged to provide axial flexibility.

The exhaust end of the turbine is held by the columns 34 and by the expansion joint, at 42, connecting the turbine exhaust nozzle 17 to the condenser, the expansion joint including a diaphragm 43 extending in a horizontal plane parallel to the turbine axis, the diaphragm providing flexibility in the direction of length of the nozzle and stiffness against lateral movement of the latter. While the columns carry the weight of the turbine, flex to accommodate radial expansion, and take the turbine reaction torque, the horizontal stiffness of the diaphragm opposes axial and lateral movements of the exhaust end of the turbine. At the inlet end, the plates 39 and 40 confine the turbine axis against transverse movement so that it is held vertically and horizontally while flexibility thereof provides for expansion and contraction axially.

In service, the condenser may be subject to unusual temperature conditions, as would be the case when starting before the vacuum is built up or when running noncondensing in the event of loss of vacuum. Under these unusual conditions, the condenser temperature may be of the order of 212° F. or more and the increase from normal temperature would cause the condenser and girder structures to expand. Therefore, the girder structures are supported by means accommodating for expansion while avoiding transverse and lengthwise displacements of the structure as well as loading of the foundation on account thereof to any substantial extent. This result is secured, for example, by plates 44 connected at their upper ends to the girder structures 12, at their lower ends to the foundation piers 16, and having their webs arranged normal to radii from a suitable vertical axis of the condenser and girder structure and which are, therefore, flexible in the direction of such radii. While the vertical axis may be at any suitable place within the projection of the condenser bounded by the supporting plates, it is shown in the vertical plane of the condenser center line and of the turbine axis and, more particularly, at the center of the exhaust inlet.

From the foregoing, it will be apparent that I have devised a unitary power plant comprising a condenser aggregate carrying a turbine and an aligned generator driven thereby and comprising a condenser and unitary side girders and wherein the latter are supported from the foundation in such manner and the turbine and generator are carried by the condenser aggregate so that expansion and contraction of the aggregate may take place without any effort being exerted on either the turbine or the generator, with the result that expansion, incident to going from condensing to noncondensing operation or when starting up, and contraction, incident to going from noncondensing to condensing operation, may take place without disturbing either the turbine or the generator. As the vertical plates supporting the side girders from the foundation are arranged normally with respect to radii from a common center, such plates restrict movement of the condenser aggregate to directions which are radial to the common center, in consequence of which the aggregate may expand and contract longitudinally and transversely without movement thereof bodily, whereby, with the vertical columns carrying the generator and the turbine capable of lateral flexibility and the plates 39 and 40 capable of axial flexibility, transverse and longitudinal expansion and contraction of the aggregate may take place without disturbing either the turbine or the generator. The elastic plates 44 protect both the condenser and the foundation from the very large horizontal loads radial to the center of support which would result from an attempt to oppose the thermal expansion of the condenser by rigid supports. Therefore, these plates operate to avoid the manufacturing cost, operating uncertainty and maintenance, of lubricated slides, which would otherwise have to be used.

While I have shown the invention in but one form, it will be obvious to those skilled in the art that it is not so limited, but is susceptible of various changes and modifications without departing from the spirit thereof.

What is claimed is:

1. In a power plant having a foundation and wherein a horizontal turbine drives an axially-aligned horizontal generator, a horizontal condenser aggregate including a condenser for steam exhausting from the turbine and girder structures unitary with the condenser at the sides thereof, means for supporting the turbine and the generator by and above the aggregate and including turbine-supporting and generator-supporting columns whose lower ends are connected to and bear on the girder structures, and vertical plates having their upper ends connected to the girder structures and their lower ends connected to the foundation, said plates having their webs arranged normally with respect to radii to a single vertical axis.

2. In a power plant having a foundation and wherein a horizontal turbine drives an axially-aligned generator, a horizontal condenser, means for supporting the turbine on the condenser so that the turbine and condenser are free to expand and contract axially relative to each other and so that the turbine axis is held vertically and horizontally irrespective of turbine or condenser expansion and contraction, and means for supporting the condenser on the foundation to avoid loading of the latter due to expansion and contraction of the condenser, the last-named means including vertical plates having their upper ends connected to the condenser and having their lower ends connected to the foundation, said plates having their planes arranged normally with respect to radii from a single vertical axis within the vertical projected area of the condenser bounded by the plates.

3. In a power plant having a foundation and wherein a horizontal turbine drives an axially-aligned generator, a horizontal condenser having an inlet opening for exhaust steam; means for supporting the turbine on the condenser so that steam exhausting from the turbine flows through the inlet opening into the condenser, so that the turbine and condenser are free to expand and contract axially relative to each other, and so that the turbine axis is held vertically and horizontally irrespective of turbine or condenser expansion and contraction; and means for supporting the condenser on the foundation to avoid loading of the latter due to expansion and contraction of the condenser; the last-named means including vertical plates having their upper ends connected to the condenser and having their lower ends connected to the foundation; said plates having their planes arranged normally with respect to radii from a single vertical axis passing through the center of the condenser exhaust steam inlet opening.

KENNETH R. STEARNS.

REFERENCES CITED

The following references are of record in the file of this patent:

UNITED STATES PATENTS

| Number | Name | Date |
|--------|------|------|
| 1,066,209 | Ljungstrom | July 1, 1913 |
| 1,156,627 | Rice | Oct. 12, 1915 |
| 1,491,423 | Rice | Apr. 22, 1924 |
| 1,830,185 | Bancel | Nov. 3, 1931 |
| 1,969,695 | Hendricks | Aug. 7, 1934 |
| 2,057,561 | Dickenson | Oct. 13, 1936 |
| 2,119,688 | Short et al. | June 7, 1938 |